United States Patent
Cline

(10) Patent No.: US 8,184,974 B2
(45) Date of Patent: May 22, 2012

(54) FIBER-TO-THE-SEAT (FTTS) FIBER DISTRIBUTION SYSTEM

(75) Inventor: James Douglas Cline, Long Beach, CA (US)

(73) Assignee: Lumexis Corporation, Irvine, CA (US)

( * ) Notice: Subject to any disclaimer, the term of this patent is extended or adjusted under 35 U.S.C. 154(b) by 973 days.

(21) Appl. No.: 11/853,729

(22) Filed: Sep. 11, 2007

(65) Prior Publication Data

US 2008/0063398 A1      Mar. 13, 2008

Related U.S. Application Data

(60) Provisional application No. 60/843,735, filed on Sep. 11, 2006.

(51) Int. Cl.
*H04J 14/00* (2006.01)

(52) U.S. Cl. ............... 398/66; 398/67; 398/68; 398/72; 398/99; 398/100; 725/76; 725/77; 725/78; 455/6.1; 455/6.3; 455/3.01; 370/392; 370/352; 370/389; 370/254; 370/535

(58) Field of Classification Search ............ 398/66, 398/67, 68, 69, 70, 71, 72, 98, 99, 100, 59, 398/58, 45, 48, 60, 63, 73, 135, 139, 164; 725/76, 77, 81, 62, 73, 75, 82, 78, 63; 455/3.01, 455/3.06, 431, 6.1, 6.3; 370/338, 352, 389, 370/392, 468, 254, 534, 535
See application file for complete search history.

(56) References Cited

U.S. PATENT DOCUMENTS

| | | | |
|---|---|---|---|
| 3,964,826 A | 6/1976 | Joseph et al. | |
| 4,337,909 A | 7/1982 | Harja | |
| 4,408,144 A | 10/1983 | Lukes | |
| 4,433,301 A | 2/1984 | Lukes | |
| 4,433,344 A | 2/1984 | Gradin et al. | |
| 4,467,381 A | 8/1984 | Harjo | |
| 4,577,191 A | 3/1986 | Pargee, Jr. | |
| 4,639,106 A | 1/1987 | Gradin | |
| 4,827,252 A | 5/1989 | Busbridge et al. | |

(Continued)

FOREIGN PATENT DOCUMENTS

CN         1048478           1/1991

(Continued)

OTHER PUBLICATIONS

Marsh, George, "A380: Jumbo Step for In-Flight-Entertainment" Avionics Magazine, Mar. 1, 2006, http://www.aviationtoday.com/av/categories/commercial/792.html, 3 pages.

(Continued)

*Primary Examiner* — Hanh Phan

(74) *Attorney, Agent, or Firm* — Knobbe, Martens, Olson & Bear, LLP

(57) ABSTRACT

A modular, scalable, extensible, In-Flight Entertainment (IFE) data communication system is described. In one embodiment, the system comprises a hub providing connection between one or more server/switch line replaceable unit including at least one server and a plurality of passenger video display units. A server, such as, for example, an audio server, a video server, an audio/video server, a game server, an application server, a file server, etc., provides data (e.g., entertainment programming, internet file data, etc.) to the video display unit. In one embodiment, the connection between the plurality of server/switch line replacement units, the hub and the plurality of video display units is provided by passive fiber optic links.

18 Claims, 4 Drawing Sheets

U.S. PATENT DOCUMENTS

| | | | |
|---|---|---|---|
| 4,828,378 A | 5/1989 | Ellis |
| 4,832,449 A | 5/1989 | Mundy et al. |
| 4,833,333 A | 5/1989 | Rand |
| 4,833,337 A | 5/1989 | Kelley et al. |
| 4,894,818 A | 1/1990 | Fujioka et al. |
| 4,903,017 A | 2/1990 | Wooler |
| 4,946,129 A | 8/1990 | Eastwick |
| 4,952,809 A | 8/1990 | McEwen |
| 4,958,381 A | 9/1990 | Toyoshima |
| 4,969,724 A | 11/1990 | Ellis |
| 4,993,788 A | 2/1991 | Steward |
| 4,994,794 A | 2/1991 | Price et al. |
| 5,007,699 A | 4/1991 | Stout |
| 5,014,342 A | 5/1991 | Pudsey |
| 5,056,737 A | 10/1991 | Taylor |
| 5,059,781 A | 10/1991 | Langdon |
| 5,076,524 A | 12/1991 | Reh et al. |
| 5,093,567 A | 3/1992 | Staveley |
| 5,096,271 A | 3/1992 | Portman |
| 5,121,702 A | 6/1992 | Johnson et al. |
| 5,123,728 A | 6/1992 | Gradin et al. |
| 5,132,527 A | 7/1992 | Karpati |
| 5,150,122 A | 9/1992 | Bell |
| 5,179,447 A | 1/1993 | Lain |
| 5,181,013 A | 1/1993 | Bagshaw et al. |
| 5,181,771 A | 1/1993 | Robak et al. |
| 5,184,231 A | 2/1993 | Ellis |
| 5,200,757 A | 4/1993 | Jairam |
| 5,203,220 A | 4/1993 | Lerman |
| 5,208,938 A | 5/1993 | Webb |
| 5,210,409 A | 5/1993 | Rowe |
| 5,220,456 A | 6/1993 | Haessig, Jr. |
| 5,222,780 A | 6/1993 | Reh et al. |
| 5,262,762 A | 11/1993 | Westover et al. |
| 5,267,775 A | 12/1993 | Nguyen |
| 5,289,196 A | 2/1994 | Gans et al. |
| 5,307,206 A | 4/1994 | Haessig, Jr. |
| 5,311,302 A | 5/1994 | Berry et al. |
| 5,333,002 A | 7/1994 | Gans et al. |
| 5,341,140 A | 8/1994 | Perry |
| 5,344,210 A | 9/1994 | Marwan et al. |
| 5,353,109 A | 10/1994 | Langdon et al. |
| 5,369,355 A | 11/1994 | Roe |
| 5,374,103 A | 12/1994 | Stange et al. |
| 5,398,991 A | 3/1995 | Smith et al. |
| 5,400,079 A | 3/1995 | Martinez et al. |
| 5,421,530 A | 6/1995 | Bertagna et al. |
| 5,440,337 A | 8/1995 | Henderson et al. |
| 5,442,556 A | 8/1995 | Boyes et al. |
| 5,467,106 A | 11/1995 | Salomon |
| 5,481,868 A | 1/1996 | Davies et al. |
| 5,517,508 A | 5/1996 | Scott |
| 5,523,551 A | 6/1996 | Scott |
| 5,529,265 A | 6/1996 | Sakurai |
| 5,535,884 A | 7/1996 | Scott et al. |
| 5,539,560 A | 7/1996 | Dennis |
| 5,539,657 A | 7/1996 | Utsumi et al. |
| 5,543,818 A | 8/1996 | Scott |
| 5,548,356 A | 8/1996 | Portman |
| 5,568,484 A | 10/1996 | Margis |
| 5,574,497 A | 11/1996 | Henderson et al. |
| 5,577,205 A | 11/1996 | Hwang et al. |
| 5,583,674 A | 12/1996 | Mosley |
| 5,596,647 A | 1/1997 | Wakai et al. |
| 5,601,208 A | 2/1997 | Scott |
| 5,636,055 A | 6/1997 | Portman et al. |
| 5,638,236 A | 6/1997 | Scott |
| 5,640,297 A | 6/1997 | Labaze |
| 5,641,092 A | 6/1997 | Scott |
| 5,647,505 A | 7/1997 | Scott |
| 5,648,904 A | 7/1997 | Scott |
| 5,666,291 A | 9/1997 | Scott et al. |
| 5,675,752 A | 10/1997 | Scott et al. |
| 5,704,798 A | 1/1998 | Portman et al. |
| 5,705,860 A | 1/1998 | Ninh et al. |
| 5,731,782 A | 3/1998 | Walls |
| 5,738,392 A | 4/1998 | Portman |
| 5,786,801 A | 7/1998 | Ichise |
| 5,786,917 A | 7/1998 | Maeno |
| 5,790,787 A | 8/1998 | Scott et al. |
| 5,793,330 A | 8/1998 | Gans et al. |
| 5,796,185 A | 8/1998 | Takata et al. |
| 5,801,749 A | 9/1998 | Ninh et al. |
| 5,805,821 A | 9/1998 | Saxena et al. |
| 5,811,791 A | 9/1998 | Portman |
| 5,812,778 A | 9/1998 | Peters et al. |
| 5,813,048 A | 9/1998 | Thom |
| 5,826,091 A | 10/1998 | Shah et al. |
| 5,831,805 A | 11/1998 | Sekine et al. |
| 5,835,127 A | 11/1998 | Booth et al. |
| 5,838,802 A | 11/1998 | Swinbanks |
| 5,847,522 A | 12/1998 | Barba |
| 5,848,235 A | 12/1998 | Scott et al. |
| 5,848,367 A | 12/1998 | Lotocky et al. |
| 5,854,591 A | 12/1998 | Atkinson |
| 5,857,869 A | 1/1999 | Parcel et al. |
| 5,859,616 A | 1/1999 | Gans et al. |
| 5,871,173 A | 2/1999 | Frank et al. |
| 5,872,934 A | 2/1999 | Whitehouse et al. |
| 5,881,228 A | 3/1999 | Atkinson et al. |
| 5,884,096 A | 3/1999 | Beasley et al. |
| 5,889,466 A | 3/1999 | Ferguson |
| 5,889,775 A | 3/1999 | Sawicz et al. |
| 5,892,478 A | 4/1999 | Moss |
| 5,894,413 A | 4/1999 | Ferguson |
| 5,896,129 A | 4/1999 | Murphy et al. |
| 5,898,401 A | 4/1999 | Walls |
| 5,907,827 A | 5/1999 | Fang et al. |
| 5,910,814 A | 6/1999 | Portman et al. |
| 5,910,966 A | 6/1999 | Sekine et al. |
| 5,914,576 A | 6/1999 | Barba |
| 5,920,186 A | 7/1999 | Ninh et al. |
| 5,923,673 A | 7/1999 | Henrikson |
| 5,923,743 A | 7/1999 | Sklar |
| 5,926,759 A | 7/1999 | Severwright |
| 5,929,895 A | 7/1999 | Berry et al. |
| 5,939,997 A | 8/1999 | Sekine et al. |
| 5,942,811 A | 8/1999 | Stumfall et al. |
| 5,944,803 A | 8/1999 | Whitehouse |
| 5,945,631 A | 8/1999 | Henrikson et al. |
| 5,953,429 A | 9/1999 | Wakai et al. |
| 5,957,798 A | 9/1999 | Smith, III et al. |
| 5,963,877 A | 10/1999 | Kobayashi |
| 5,973,722 A * | 10/1999 | Wakai et al. .................. 725/76 |
| 5,978,736 A | 11/1999 | Greendale |
| 5,986,810 A | 11/1999 | Webb |
| 5,991,138 A | 11/1999 | Sklar et al. |
| 5,999,520 A | 12/1999 | Little |
| 6,008,779 A | 12/1999 | Ellis |
| 6,011,322 A | 1/2000 | Stumfall et al. |
| 6,014,381 A | 1/2000 | Troxel et al. |
| 6,031,299 A | 2/2000 | Stumfall et al. |
| 6,034,688 A | 3/2000 | Greenwood et al. |
| 6,038,426 A | 3/2000 | Williams, Jr. |
| 6,052,426 A | 4/2000 | Maurice |
| 6,055,634 A | 4/2000 | Severwright |
| 6,057,875 A | 5/2000 | Ferguson et al. |
| 6,058,288 A | 5/2000 | Reed et al. |
| 6,092,868 A | 7/2000 | Wynn |
| 6,110,261 A | 8/2000 | Guiragossian |
| 6,130,636 A | 10/2000 | Severwright |
| 6,131,119 A | 10/2000 | Fukui |
| 6,134,674 A | 10/2000 | Akasheh |
| 6,154,910 A | 12/2000 | Corney |
| 6,157,471 A | 12/2000 | Bignolles et al. |
| 6,160,591 A | 12/2000 | Stumfall et al. |
| 6,163,823 A | 12/2000 | Henrikson |
| 6,185,643 B1 | 2/2001 | Kirshtein et al. |
| 6,189,127 B1 | 2/2001 | Fang et al. |
| 6,195,040 B1 | 2/2001 | Arethens |
| 6,208,307 B1 | 3/2001 | Frisco et al. |
| 6,249,913 B1 | 6/2001 | Galipeau et al. |
| 6,266,736 B1 | 7/2001 | Atkinson et al. |
| 6,266,815 B1 | 7/2001 | Shen et al. |
| 6,272,572 B1 | 8/2001 | Backhaus et al. |
| 6,310,286 B1 | 10/2001 | Troxel et al. |
| 6,359,608 B1 | 3/2002 | Lebrun et al. |

| Patent No. | Date | Inventor |
|---|---|---|
| 6,373,216 B1 | 4/2002 | Ho |
| 6,390,920 B1 | 5/2002 | Infiesto et al. |
| 6,452,155 B1 | 9/2002 | Sherlock et al. |
| 6,453,259 B1 | 9/2002 | Infiesto et al. |
| 6,453,267 B1 | 9/2002 | Rudzik et al. |
| 6,457,837 B1 | 10/2002 | Steffensmeier |
| 6,466,258 B1 | 10/2002 | Mogenis et al. |
| 6,477,152 B1 | 11/2002 | Hiett |
| 6,490,510 B1 | 12/2002 | Choisnet |
| 6,493,147 B1 | 12/2002 | Baudou et al. |
| 6,499,027 B1 | 12/2002 | Weinberger |
| 6,507,952 B1 | 1/2003 | Miller et al. |
| 6,520,015 B1 | 2/2003 | Alause et al. |
| D473,233 S | 4/2003 | Politzer |
| 6,549,754 B1 | 4/2003 | Miller et al. |
| 6,556,114 B1 | 4/2003 | Guillemin et al. |
| 6,561,006 B1 | 5/2003 | Roberge et al. |
| 6,588,117 B1 | 7/2003 | Martin et al. |
| 6,611,311 B1 | 8/2003 | Kretz et al. |
| 6,612,870 B1 | 9/2003 | Rauscent |
| 6,614,126 B1 | 9/2003 | Mitchell |
| 6,633,156 B1 | 10/2003 | Choisnet |
| 6,654,806 B2 | 11/2003 | Wall et al. |
| 6,661,353 B1 | 12/2003 | Gopen |
| 6,661,664 B2 | 12/2003 | Sarno et al. |
| 6,679,112 B2 | 1/2004 | Collot et al. |
| 6,681,250 B1 | 1/2004 | Thomas et al. |
| 6,698,281 B1 | 3/2004 | Choisnet |
| 6,715,150 B1 | 4/2004 | Potin |
| 6,735,309 B1 | 5/2004 | Lemanski et al. |
| 6,741,841 B1 | 5/2004 | Mitchell |
| 6,754,609 B2 | 6/2004 | Lescourret |
| 6,756,304 B1 | 6/2004 | Robert |
| 6,775,462 B1 | 8/2004 | Wang et al. |
| 6,782,392 B1 | 8/2004 | Weinberger et al. |
| 6,801,769 B1 | 10/2004 | Royalty |
| 6,806,885 B1 | 10/2004 | Piper et al. |
| 6,807,148 B1 | 10/2004 | Eicher |
| 6,807,538 B1 | 10/2004 | Weinberger et al. |
| 6,810,527 B1 | 10/2004 | Conrad et al. |
| 6,811,348 B1 | 11/2004 | Meyer et al. |
| 6,812,992 B2 | 11/2004 | Nemeth |
| 6,813,777 B1 | 11/2004 | Weinberger et al. |
| 6,815,716 B2 | 11/2004 | Sanson et al. |
| 6,817,240 B2 | 11/2004 | Collot et al. |
| 6,822,812 B1 | 11/2004 | Brauer |
| 6,824,317 B2 | 11/2004 | Finizio et al. |
| D499,402 S | 12/2004 | Boyer, Jr. |
| 6,844,874 B2 | 1/2005 | Maurice |
| 6,845,658 B2 | 1/2005 | Roberge et al. |
| D503,707 S | 4/2005 | Boyer, Jr. |
| 6,876,905 B2 | 4/2005 | Farley et al. |
| 6,894,490 B2 | 5/2005 | Lescourret |
| 6,899,390 B2 | 5/2005 | Sanfrod et al. |
| D506,733 S | 6/2005 | Boyer, Jr. |
| 6,918,294 B1 | 7/2005 | Roberge |
| 6,919,874 B1 | 7/2005 | Maurice |
| 6,924,785 B1 | 8/2005 | Kretz et al. |
| 6,937,194 B1 | 8/2005 | Meier et al. |
| 6,938,258 B1 | 8/2005 | Weinberger et al. |
| 6,956,680 B2 | 10/2005 | Morvieu et al. |
| 6,972,747 B2 | 12/2005 | Bayot et al. |
| 6,973,479 B2 | 12/2005 | Brady, Jr. et al. |
| 6,977,638 B1 | 12/2005 | Bayot et al. |
| 7,028,304 B1 | 4/2006 | Weinberger et al. |
| 7,040,697 B1 | 5/2006 | Tuccinardi et al. |
| 7,042,528 B2 | 5/2006 | Lester et al. |
| 7,068,712 B1 | 6/2006 | Zang et al. |
| 7,088,525 B2 | 8/2006 | Finizio et al. |
| 7,090,128 B2 | 8/2006 | Farley et al. |
| 7,102,691 B2 | 9/2006 | Dischert et al. |
| 7,113,978 B2 | 9/2006 | Beasley et al. |
| 7,114,171 B2 | 9/2006 | Brady et al. |
| 7,124,426 B1 | 10/2006 | Tsuria et al. |
| 7,177,638 B2 | 2/2007 | Funderburk et al. |
| 7,187,498 B2 | 3/2007 | Bengoechea et al. |
| 7,199,396 B2 | 4/2007 | Lebrun |
| 7,200,229 B2 | 4/2007 | Spring et al. |
| 7,213,055 B1 | 5/2007 | Kathol |
| 7,216,296 B1 | 5/2007 | Broberg et al. |
| 7,249,167 B1 | 7/2007 | Liaw et al. |
| 7,269,761 B2 | 9/2007 | Yi |
| 7,280,134 B1 | 10/2007 | Henderson et al. |
| 7,280,825 B2 | 10/2007 | Keen et al. |
| 7,286,289 B2 | 10/2007 | Bengoechea et al. |
| 7,289,499 B1 | 10/2007 | Chinn et al. |
| 7,330,649 B2 | 2/2008 | Finizio et al. |
| 7,337,043 B2 | 2/2008 | Bull |
| 7,343,157 B1 | 3/2008 | Mitchell |
| 7,344,102 B1 | 3/2008 | Royer et al. |
| D566,032 S | 4/2008 | Berthou et al. |
| 7,352,929 B2 | 4/2008 | Hagen et al. |
| 7,403,780 B2 | 7/2008 | VanLaningham et al. |
| 7,405,773 B2 | 7/2008 | Lester et al. |
| 7,438,511 B2 | 10/2008 | Legeay |
| 7,483,382 B1 | 1/2009 | Toillon et al. |
| 7,483,696 B1 | 1/2009 | Mitchell |
| 7,486,960 B2 | 2/2009 | Brady, Jr. et al. |
| 7,487,938 B2 | 2/2009 | Brady, Jr. et al. |
| 7,496,361 B1 | 2/2009 | Mitchell et al. |
| 7,565,143 B2 | 7/2009 | Takeuchi et al. |
| 7,566,254 B2 | 7/2009 | Sampica et al. |
| 7,580,528 B2 | 8/2009 | Farley et al. |
| 7,587,733 B2 | 9/2009 | Keen et al. |
| 7,587,734 B2 | 9/2009 | Logan et al. |
| 7,599,691 B1 | 10/2009 | Mitchell |
| 7,600,248 B1 | 10/2009 | Berry |
| 7,619,422 B2 | 11/2009 | Tsamis et al. |
| 7,620,364 B2 | 11/2009 | Higashida et al. |
| 7,621,770 B1 | 11/2009 | Finizio et al. |
| 7,628,357 B2 | 12/2009 | Mercier et al. |
| D607,800 S | 1/2010 | Canal et al. |
| D607,801 S | 1/2010 | Canal et al. |
| 7,642,974 B2 | 1/2010 | Brady, Jr. et al. |
| 7,649,696 B2 | 1/2010 | Finizio et al. |
| 7,675,849 B2 * | 3/2010 | Watson et al. ................. 370/217 |
| 7,676,225 B2 | 3/2010 | Funderburk et al. |
| 7,680,092 B2 | 3/2010 | VanLaningham et al. |
| 7,715,783 B2 | 5/2010 | Girard et al. |
| 7,725,569 B2 | 5/2010 | Brady, Jr. et al. |
| 7,792,189 B2 | 9/2010 | Finizio et al. |
| 7,808,891 B2 | 10/2010 | Law et al. |
| 7,830,781 B2 | 11/2010 | Zogg et al. |
| 7,836,472 B2 | 11/2010 | Brady, Jr. et al. |
| 7,843,554 B2 | 11/2010 | Koenck et al. |
| 2002/0045484 A1 | 4/2002 | Eck et al. |
| 2002/0046300 A1 | 4/2002 | Hanko et al. |
| 2002/0063924 A1 | 5/2002 | Kimbrough et al. |
| 2002/0180904 A1 | 12/2002 | Lauzun et al. |
| 2003/0016806 A1 | 1/2003 | Emerson |
| 2003/0033459 A1 | 2/2003 | Garnett |
| 2003/0064714 A1 | 4/2003 | Sanford et al. |
| 2003/0085818 A1 | 5/2003 | Renton et al. |
| 2003/0088360 A1 | 5/2003 | Ikhlef et al. |
| 2003/0093798 A1 | 5/2003 | Rogerson |
| 2003/0107248 A1 | 6/2003 | Sanford et al. |
| 2003/0110466 A1 | 6/2003 | Dricot et al. |
| 2003/0184957 A1 | 10/2003 | Stahl et al. |
| 2003/0217363 A1 | 11/2003 | Brady et al. |
| 2004/0052372 A1 | 3/2004 | Jakoubek |
| 2004/0217976 A1 | 11/2004 | Sanford |
| 2004/0235469 A1 * | 11/2004 | Krug ............................ 455/431 |
| 2005/0044186 A1 | 2/2005 | Petrisor |
| 2005/0044564 A1 | 2/2005 | Stopniewicz et al. |
| 2005/0053237 A1 | 3/2005 | Hanson |
| 2005/0055228 A1 | 3/2005 | Boyer et al. |
| 2005/0055278 A1 | 3/2005 | Boyer |
| 2005/0132407 A1 | 6/2005 | Boyer, Jr. et al. |
| 2005/0177763 A1 | 8/2005 | Stoler |
| 2005/0193257 A1 | 9/2005 | Stoler |
| 2005/0216938 A1 | 9/2005 | Brady, Jr. et al. |
| 2005/0256616 A1 | 11/2005 | Rhoads |
| 2005/0268319 A1 | 12/2005 | Brady, Jr. et al. |
| 2005/0278753 A1 | 12/2005 | Brady, Jr. et al. |
| 2005/0278754 A1 | 12/2005 | Bleacher et al. |
| 2006/0107295 A1 * | 5/2006 | Margis et al. ................... 725/81 |
| 2006/0143660 A1 | 6/2006 | Logan et al. |
| 2006/0143661 A1 | 6/2006 | Funderburk et al. |

| | | |
|---|---|---|
| 2006/0143662 A1 | 6/2006 | Easterling et al. |
| 2006/0174285 A1* | 8/2006 | Brady et al. .................. 725/76 |
| 2006/0179457 A1 | 8/2006 | Brady et al. |
| 2006/0184583 A1 | 8/2006 | Renton et al. |
| 2006/0194575 A1 | 8/2006 | Stadelmeier et al. |
| 2006/0277589 A1 | 12/2006 | Margis et al. |
| 2006/0291803 A1 | 12/2006 | Watson et al. |
| 2007/0044126 A1 | 2/2007 | Mitchell |
| 2007/0077998 A1* | 4/2007 | Petrisor .......................... 463/42 |
| 2007/0130591 A1 | 6/2007 | Brady, Jr. et al. |
| 2007/0164609 A1 | 7/2007 | Shalam et al. |
| 2007/0280199 A1 | 12/2007 | Rong |
| 2007/0292108 A1 | 12/2007 | Reichert et al. |
| 2007/0294732 A1 | 12/2007 | Brady et al. |
| 2008/0023600 A1 | 1/2008 | Perlman |
| 2008/0040756 A1 | 2/2008 | Perlman et al. |
| 2008/0050512 A1 | 2/2008 | Lower et al. |
| 2008/0056178 A1 | 3/2008 | Alexander et al. |
| 2008/0063398 A1 | 3/2008 | Cline |
| 2008/0089658 A1 | 4/2008 | Grady et al. |
| 2008/0105784 A1 | 5/2008 | Barroca |
| 2008/0142585 A1 | 6/2008 | Foreman et al. |
| 2008/0157997 A1 | 7/2008 | Bleacher et al. |
| 2008/0159174 A1 | 7/2008 | Enomoto et al. |
| 2008/0187282 A1 | 8/2008 | Brady et al. |
| 2008/0189748 A1 | 8/2008 | Bleacher et al. |
| 2008/0237440 A1 | 10/2008 | Lester et al. |
| 2008/0240029 A1 | 10/2008 | Lynch et al. |
| 2008/0240038 A1 | 10/2008 | Lynch et al. |
| 2008/0240061 A1 | 10/2008 | Lynch et al. |
| 2008/0240062 A1 | 10/2008 | Lynch et al. |
| 2008/0244664 A1 | 10/2008 | Hong et al. |
| 2008/0259023 A1 | 10/2008 | Chang |
| 2008/0285459 A1 | 11/2008 | Diab et al. |
| 2008/0310609 A1 | 12/2008 | Brady, Jr. et al. |
| 2008/0312778 A1 | 12/2008 | Correa et al. |
| 2008/0313259 A1 | 12/2008 | Correa et al. |
| 2009/0007193 A1 | 1/2009 | Correa et al. |
| 2009/0007194 A1 | 1/2009 | Brady, Jr. et al. |
| 2009/0034540 A1 | 2/2009 | Law |
| 2009/0068474 A1 | 3/2009 | Lower et al. |
| 2009/0077595 A1 | 3/2009 | Sizelove et al. |
| 2009/0079705 A1 | 3/2009 | Sizelove et al. |
| 2009/0081947 A1 | 3/2009 | Margis |
| 2009/0083805 A1 | 3/2009 | Sizelove et al. |
| 2009/0094635 A1 | 4/2009 | Aslin et al. |
| 2009/0096857 A1 | 4/2009 | Frisco et al. |
| 2009/0100476 A1 | 4/2009 | Frisco et al. |
| 2009/0119721 A1 | 5/2009 | Perlman et al. |
| 2009/0202241 A1 | 8/2009 | Yu et al. |
| 2009/0228908 A1 | 9/2009 | Margis et al. |
| 2009/0243352 A1 | 10/2009 | Cailleteau |
| 2009/0246355 A9 | 10/2009 | Lower et al. |
| 2009/0262290 A1 | 10/2009 | Sampica et al. |
| 2009/0279257 A1 | 11/2009 | Lower et al. |
| 2009/0282469 A1 | 11/2009 | Lynch et al. |
| 2010/0008503 A1 | 1/2010 | Farley et al. |
| 2010/0013279 A1 | 1/2010 | Cailleteau |
| 2010/0027461 A1 | 2/2010 | Bothorel |
| 2010/0032999 A1 | 2/2010 | Petitpierre |
| 2010/0060739 A1 | 3/2010 | Salazar |
| 2010/0064327 A1 | 3/2010 | Lynch et al. |
| 2010/0066616 A1 | 3/2010 | Brady, Jr. et al. |
| 2010/0088731 A1 | 4/2010 | Vanyek |
| 2010/0098418 A1 | 4/2010 | Bouet et al. |
| 2010/0138581 A1 | 6/2010 | Bird et al. |
| 2010/0138582 A1 | 6/2010 | Bird et al. |
| 2010/0138879 A1 | 6/2010 | Bird et al. |
| 2010/0144267 A1 | 6/2010 | Funderburk et al. |
| 2010/0152962 A1 | 6/2010 | Bennett et al. |
| 2010/0180299 A1 | 7/2010 | Girard et al. |
| 2010/0189089 A1 | 7/2010 | Lynch et al. |
| 2010/0195634 A1 | 8/2010 | Thompson |
| 2010/0199196 A1 | 8/2010 | Thompson |
| 2011/0063998 A1 | 3/2011 | Petrisor et al. |
| 2011/0065303 A1 | 3/2011 | Petrisor et al. |
| 2011/0107377 A1 | 5/2011 | Petrisor et al. |
| 2011/0162015 A1 | 6/2011 | Holyoake et al. |

FOREIGN PATENT DOCUMENTS

| | | |
|---|---|---|
| CN | 1048478 A1 | 1/1991 |
| EP | 1469652 A | 10/2004 |
| GB | 2235800 | 5/1993 |
| WO | WO 90-15508 A1 | 12/1990 |
| WO | WO 98-50848 A1 | 11/1998 |
| WO | WO 02-061594 A1 | 8/2002 |
| WO | WO 02-093925 A1 | 11/2002 |
| WO | WO 2005/004490 | 1/2005 |
| WO | WO 2006/062641 | 6/2006 |
| WO | WO 2006-062641 A1 | 6/2006 |
| WO | WO 2007/035739 | 3/2007 |
| WO | WO 2008/033870 | 3/2008 |
| WO | WO 2011/017233 | 2/2011 |
| WO | WO 2011/020071 | 2/2011 |
| WO | WO 2011/022708 | 2/2011 |
| WO | WO 2011/044148 | 4/2011 |

OTHER PUBLICATIONS

Office Action dated Jun. 25, 2009 from Related U.S. Appl. No. 10/867,384.

Office Action dated Dec. 11, 2008 from Related U.S. Appl. No. 11/533,258.

Cisco Headquarters, "Guide to ATM Technology", 1999, Cisco Systems, Inc.

Office Action dated Sep. 4, 2009 from Related U.S. Appl. No. 11/533,258.

George Marsh: "A380: Jumbo Step for In-Flight Entertainment" Avionics Magazine, Mar. 1, 2006, retrieved from the Internet: URL:http://www.aviationtoday.com/av/categories/commercial/792.html.

Chinese First Office Action re App. No. 200680034350.3, dated Jul. 10, 2009.

PCT International Patentability Report and Written Opinion re App. No. PCT/US2006/036492, dated Mar. 26, 2008.

PCT International Preliminary Report and Written Opinion re App. No. PCT/US2007/078202, dated Mar. 17, 2009.

PCT International Search Report and Written Opinion re App. No. PCT/US 10/46246, date of mailing Nov. 29, 2010.

PCT International Search Report and Written Opinion, re App. No. PCT/US2010/44017, dated Oct. 25, 2010.

PCT International Search Report and Written Opinion, re App. No. PCT/US2010/45538, dated Nov. 12, 2010.

PCT International Search Report re App. No. PCT/US2006/036492, dated Mar. 8, 2007.

PCT International Search Report re App. No. PCT/US2007/078202, dated Oct. 28, 2008.

PCT Search Report re App. No. PCT/US2004/019030, dated Jan. 14, 2005.

PCT Search Report and Written Opinion re App. No. PCT/US2010/051505, dated Dec. 28, 2010.

* cited by examiner

FIBER-TO-THE-SEAT (FTTS) FIBER DISTRIBUTION SYSTEM

CROSS-REFERENCE TO RELATED APPLICATIONS

This application claims the benefit under 35 U.S.C. §119(e) of the following U.S. Provisional Patent Application No. 60/843,735, filed Sep. 11, 2006 titled "Fiber-to-the-Seat (FTTS) Fiber Distribution System" which is hereby incorporated by reference in its entirety and made part of the specification.

BACKGROUND

1. Field of the Invention

This application in general relates to the field of distributing information content using a fiber-optic network. Some embodiments in this application describe systems and architecture to provide in-flight entertainment.

2. Description of the Related Art

In-flight entertainment (IFE) systems have evolved significantly over the last 25 years. Prior to 1978, IFE systems consisted only of audio systems. In 1978, Bell and Howell (Avicom Division) introduced a group viewing video system based on VHS tapes. Ten years later, in 1988, Airvision introduced the first inseat video system allowing passengers to choose between several channels of broadcast video. In 1997, Swissair installed the first interactive Video on Demand (VOD) system. Currently, several IFE systems provide VOD with full DVD-like controls.

Until about 2000, the pace at which capabilities were added to IFE systems outpaced the technological advances found in IFE systems, leading to heavier more costly systems. IFE suppliers have leveraged technological advances to moderately reduce the cost and size of IFE systems. However, significant drops in legacy IFE system costs are not easily realized, as these systems are implemented with proprietary hardware and software architectures created at significant development cost that must be amortized over a small group of buyers (namely, the airlines). Whereas a typical terrestrial VOD system may have tens of thousands of installations supporting tens of millions of end users, a typical IFE system may have only several hundred installations supporting tens of thousands of seats.

In terrestrial VOD systems, the number of distinct hardware components encompassed in the end-to-end system can be quite large. Head-end components (VOD servers, system controllers, key managers, game servers, web servers, etc.) are generally mounted in standard racks, distribution components (Ethernet switches, ATM switches, SONET switches, etc.) are spatially distributed from the head end out to the viewing room, and within the viewing room there is generally a set top box and video display unit (VDU). Except for the set top box and in some cases the VOD server, terrestrial VOD system hardware components are commercial off-the-shelf (COTS) products. Therefore, there is generally little development or operational cost penalty for having more hardware. Also, the operational cost of terrestrial VOD systems is minimally impacted by the size, weight, or power of the system.

In the IFE environment, on the other hand, operational costs are highly dependent on the weight and power of the IFE system. IFE installation costs and passenger comfort depend largely on the size and form factor of the IFE line replaceable units (LRUs). And an airline's IFE operation and maintenance costs depend largely on the number of distinct LRUs, both within a single aircraft and across an airline's entire fleet of aircraft.

SUMMARY

In one embodiment described herein a fiber to the seat distribution system is disclosed. The fiber to the seat distribution systems comprises a fiber-optic junction box and a number, M, of server-switch line replacement units provided to said fiber-optic junction box via one or more fiber-optic network cables. The system also comprises a number, N, of video display units provided to said junction box by a plurality of fiber-optic network cables.

In another embodiment, a passenger entertainment system is disclosed. The passenger entertainment system comprises one or more servers. The system further comprises one or more trunk line to head-end cable assemblies, having a first end and a second end, wherein said first end has a number, P, of cable terminations and said second end has a number, Q, of cable terminations. The system also comprises one or more trunk line disconnect assemblies, having a first end and a second end, wherein said first end has Q connectors that substantially mate with the number, Q, of cable terminations on the second end of the trunk line to head-end cable assembly. Additionally, the system comprises one or more trunk line to seat group cable disconnect assemblies; having a first end and a second end, wherein said first end of the trunk line to seat group disconnect assembly is substantially joined to the second end of the trunk line disconnect assembly. The passenger entertainment system further comprises one or more seat group disconnect assemblies having a first end and a second end, wherein the first end of the seat group disconnect assembly is substantially joined to the second end of the trunk line to seat group cable disconnect assembly. The system also comprises a number, N, of seat group disconnect to video display unit cable assemblies, each of said seat group disconnect to video display unit cable assembly having a first end and a second end, wherein said first end of each of the seat group disconnect to video display unit cable assembly, substantially provides connection with the second end of the seat group disconnect and the second end of each of seat group disconnect to video display unit cable assembly, substantially joins to a video display unit.

In another embodiment, a method of distributing information in connection with passenger entertainment system is disclosed herein. The said method comprises marshalling information in a server. The method further comprises transporting information from said server to one or more trunk line disconnect assemblies over one or more trunk line to server cable assemblies, transporting information from said one or more trunk line disconnect assemblies to one or more trunk line to seat group disconnect assemblies. The method also comprises transporting information from said one or more trunk line to seat group disconnect assemblies to one or more seat group disconnect assemblies over one or more trunk line to seat group disconnect cable assemblies. Additionally, the method comprises transporting information from said one or more seat group disconnect assemblies to one or more video display units over one or more seat group disconnect to video display unit cable assemblies.

DETAILED DESCRIPTION

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any mode of transportation that is configured to provide entertainment and or information (e.g., audio-video programming, news, Internet data, etc.) to passengers. The embodiments described herein can be deployed in airplanes, trains, ships, buses, etc. Additionally it is envisioned that these systems may also be deployed in college/university dormitories, hospitals, lecture halls, auditoriums, theatres, etc.

In various embodiments described herein systems and method to implement a fiber-to-the-seat distribution architecture is disclosed. The fiber-to-the-seat fiber distribution system comprises one or more servers that are provided with server disconnects. Information from the server is transported over the fiber-to-the-seat distribution network to video display units disposed on the seat-backs or overhead seats in a mode of transporting people. The fiber-to-the-seat fiber distribution system comprises a junction box substantially linking a plurality of servers and a plurality of video display units. The means of providing connection between the server, the junction and the video display units can include passive fiber optic networks. Other systems may be provided to the junction box. In one embodiment, each of the plurality of video display units is joined to one server by a passive fiber optic link.

Figure 1:
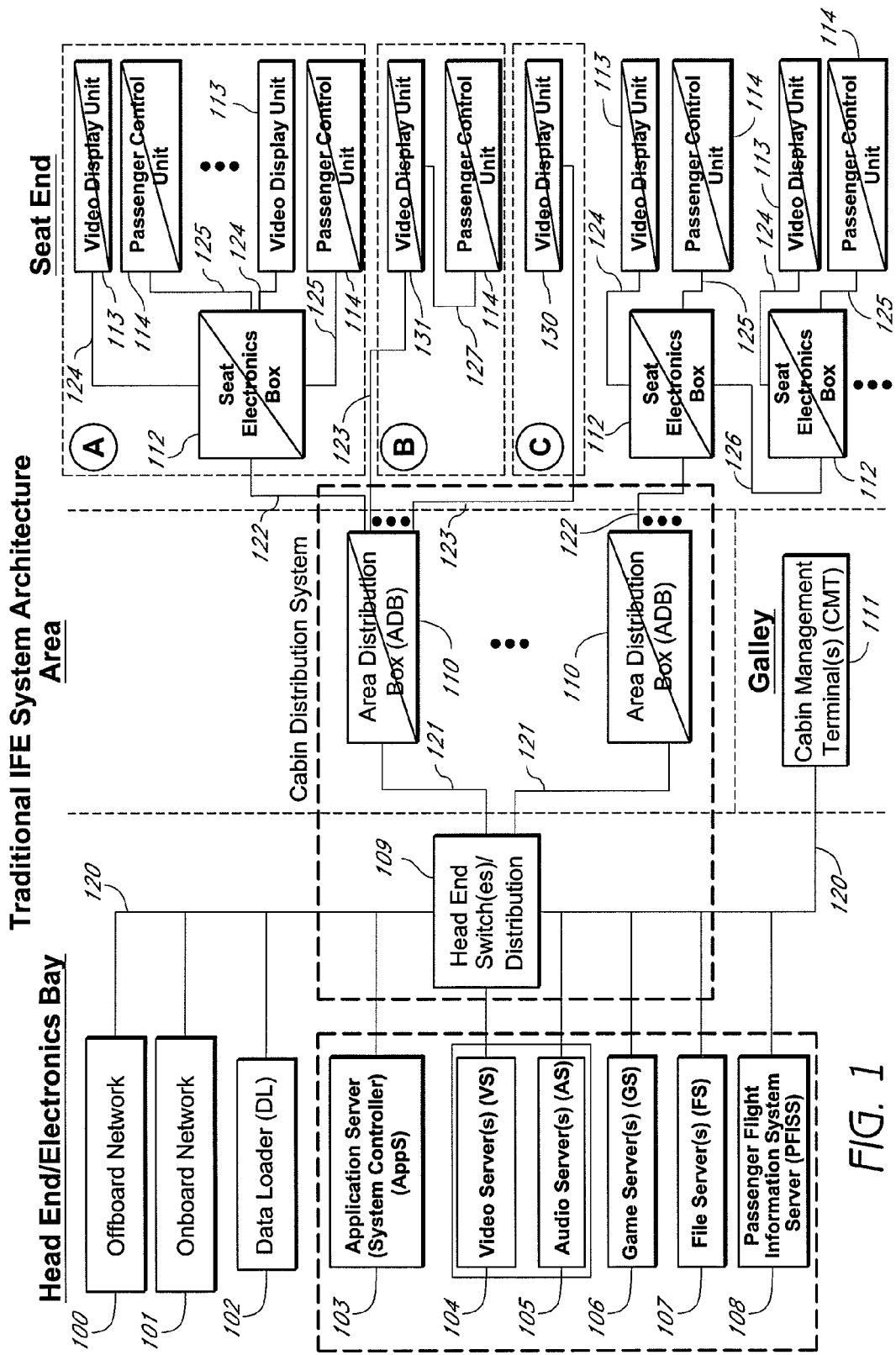
FIG. 1 shows a legacy Inflight Entertainment system architecture.

FIG. 1 illustrates a typical, legacy IFE system architecture which is also described in U.S. patent application Ser. No. 11/533,258 (Atty. Ref. No. ZOREC.009A), which is incorporated herein by reference in its entirety and made part of the specification hereof. The left of the figure shows the components that are typically found at the head end of the system or in an electronics bay. The right side of the figure illustrates the components that are typically found at the passenger seat. The middle section of the figure shows the components that are typically found between the head end and the seats. These components are area distribution boxes (ADBs) 110 or a combination of ADBs 110 and zone interface units (ZIUs) (not shown). One purpose of the ADBs 110 and ZIUs is to fan-out the distribution of IFE data from the head end to the seats. In some embodiments, the ADB 110 may be joined to one seat electronics box (SEB) 112 within each seat column. The SEB 112 may then distribute data forward and/or backward to an adjacent seat group in the same seat column.

On the right side of FIG. 1, three examples of in-seat architectures are shown. Box A illustrates an example of in-seat architecture wherein the SEB 112 is joined to a plurality of VDUs 113. Boxes B and C illustrate in-seat architectures wherein the SEB 112 may be eliminated or significantly reduced in size by joining the ADB 110 to the VDU 113/131/130. In some embodiments, the VDU 113/131/130 may be intelligent and comprise decision circuits and memory banks. In some systems the SEB 112 can be eliminated, generally at the expense of VDU 113/131/130 size, weight, and power. For example, in boxes B and C the ADB 110 is joined directly to the VDU 131/130 without the SEB 112. The description and functions of the various components in this architecture are summarized below.

Offboard Network—An offboard network 100 communicates with terrestrial networks generally through satellite-based or ground-based radio frequency (RF) networks. Offboard network 100 is generally joined to an IFE head-end switch 109 through one of head-end network cables 120. A bidirectional version of offboard network 100 provides network connectivity of an IFE onboard network 101 with terrestrial networks (broadband connectivity). A unidirectional version of offboard network 100 provides an IFE onboard network 100 with access to off-aircraft broadcast data sources such as television (broadcast video).

Onboard Network—An onboard network 101 provides the IFE system with access to non-IFE specific data such as: reading light control, flight attendant call and flight information for applications such as moving maps. Onboard network 101 is generally connected to head-end switch 109 with one of head-end network cables 120.

Application Server (AppS)—An application server 103 is a system controller that generally provides one or more of the following services: content management; channel packaging; transaction processing; billing system integration; services management; provisioning integration; system administration and management; encryption management (key servers, authentication etc.); software client management; and server integration for audio, video, gaming and file servers. AppS 103 generally connects to head-end switch 109 with one of head-end network cables 120.

Audio Server (AS)—An audio server 105 provides one or more of the following types of services to the IFE system: Audio on Demand (AOD) and broadcast audio. AS 105 generally connects to head-end switch 109 with one of head-end network cables 120.

Video Server (VS)—A video server 104 provides one or more of the following type of services to the IFE system: Video on Demand (VOD), Near Video on Demand (NVOD), Pay-per-View (PPV), Network Personal Video Recorder (PVR) and broadcast video. In the IFE industry, most systems with VS capability also include AS capability in the same package. The term of art for the composite package is Audio Video on Demand, or AVOD. This composite packing is denoted in FIG. 1 by enclosing AS 105 and VS 104 by the light dotted lines. VS 104 generally connects to head-end switch 109 with one of head-end network cables 120.

Data Loader (DL)—A data loader 102 provides one or more of the following types of services for the IFE system: media content updates (movies, audio, games, internet web pages, files, etc.), key updates, and transaction data transfers. DL 102 generally transfers data to and from the IFE system using one of the following mechanisms: removable disk or tape that is inserted into a DL installed on the aircraft, a portable disk drive or tape drive that is carried onboard and temporarily connected to AS 105 or VS 104, a wireless LAN, or other wireless link. DL 102 generally connects to head-end switch 109 with one of head-end network cables 120.

Game Server (GS)—A game server 106 generally provides one or more of the following services for the IFE system: the logic and programming for the games and dynamically delivered web pages for browser based games. GS 106 generally connects to head-end switch 109 with one of head-end network cables 120.

File Server (FS)—A file server 107 generally provides one or more of the following types of services for the IFE system: cached internet content, cached user data, and user profile data. FS 107 generally connects to head-end switch 109 with one of head-end network cables 120.

Cabin Management Terminal (CMT)—A cabin management terminal 111 allows flight attendants to perform system management and administration functions for the IFE system such as: LRU reboot, video channel preview, flight attendant override, attendant call status, reading light status, bit interrogation and system test. CMT 111 generally connects to head-end switch 109 with one of head-end network cables 120.

Passenger Flight Information System Server (PFISS)—A passenger flight information system server 108 uses inputs from the aircraft navigation system and computes various flight information including time to destination, speed, altitude, outside air temperature, time at destination, aircraft location for display to passenger either in text form, or graphically such as a moving map display. PFISS 108 generally connects to head-end switch 109 with one of head-end network cables 120.

Head End Switch/Distribution System—A head-end switch/distribution system 109 interconnects one or more head-end data servers, data networks, and/or other systems on the head-end of the IFE system. The head end switch/distribution system 109 also connects to area distribution boxes 110 through head-end to area network cables 121.

Area Distribution Box (ADB)—An area distribution boxes 110 generally provide a distribution and signal regeneration function for connecting head-end switch 109 to passenger seat LRUs. In some embodiments, ADBs 110 connect to head-end switch 109 over head-end to area network cables 121 and to one of SEBs 112 within each seat column over an ADB to SEB network cable 122.

Seat Electronics Box (SEB)—Seat electronics boxes 112 are typically in-seat LRUs that are generally mounted under the seat and contain the network interface and the local processing unit for a seat group. In passenger transport, two or more seats mounted to the same structure form a seat group. Most common seat group size is three seats. However other sizes such as two seats, fours seats, five seats or more are possible. Because of this in-seat electronics are often designed at the seat group level rather than at the seat level. Each of SEBs 112 may support a plurality of seats (e.g. two, three, fours, five, six or seven) in a seat group. SEBs 112 are usually mounted under the middle seat of the seat group. In some embodiments the SEBs 112 may be mounted to an edge of a seat group. SEBs 112 receives IFE data from one of the ADBs 110 and distributes data forward and/or backward to an adjacent seat group in the same seat column. In some embodiments, the data may be distributed to another SEB over one of the SEB to SEB network cables 126. In other embodiments, the SEB may distribute the data to a VDU 113 or a Passenger Control Unit (PCU) 114. Common in-seat implementations of an SEB are illustrated in FIG. 1. In one implementation, the SEB generates raw pixel data that is fed to seat-back mounted VDU 113 over the SEB to VDU network cable 124. The SEB also generates raw audio and sends and receives other control data that are transported to a passenger control unit (PCU) over an SEB to PCU network cable 125. In another implementation, an SEB distributes data forward and backward to SEBs in an adjacent seat group in the same seat column over an SEB to SEB network cable 126.

Video Display Unit (VDU)—A video display unit 113 at a minimum contains the physical display device (e.g., flat panel display) for viewing video content and navigating the IFE menu system. However, due to complaints about the size of SEBs 112 from airline passengers and advances in technology, IFE suppliers have recently begun migrating more of the electronics that were previously located in SEBs 112 to VDUs 113/131/130 to reduce the size of SEBs 112. Callout box B shows an example of a VDU 131 in which the SEB 112 has been completely eliminated and VDU 131 communicates directly to ADB 110 over an ADB to VDU network cable 123. In this case, PCU 114 connects to VDU 131 over a PCU to VDU network cable 127. Callout box C shows an example of a VDU 130 in which both SEB 112 and PCU 114 have been eliminated. In this example VDU 130 communicates directly to ADB 110 over an ADB to VDU network cable 127.

Passenger Control Unit (PCU)—The passenger control unit (PCU) 114 is generally a unit that is fixed-mounted or tether-mounted to a passenger's armrest and provides control functions for interacting with the IFE system. These functions generally include the following: volume control, channel control, lighting control, attendant call button, menu buttons, and menu selection buttons.

Figure 2:
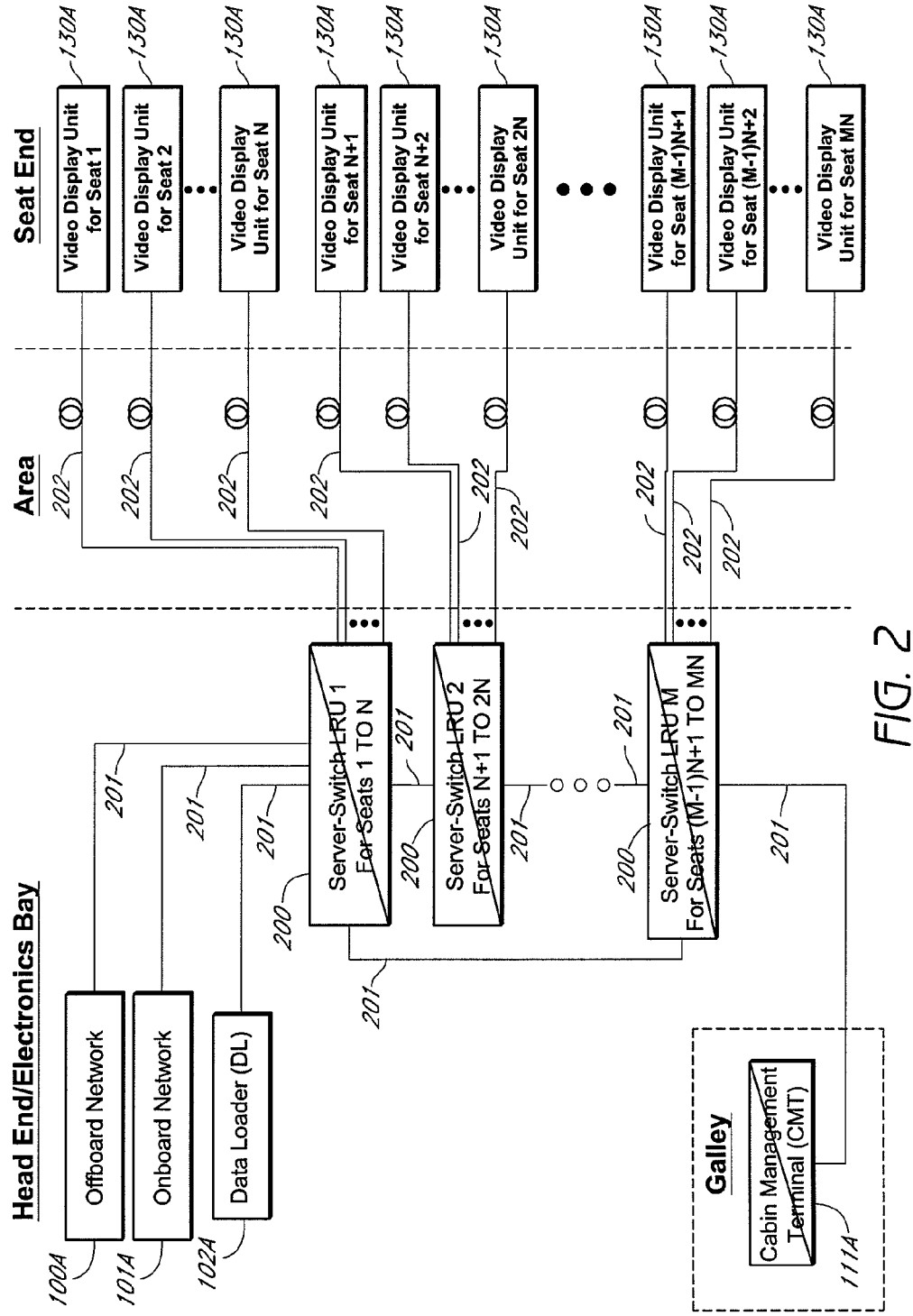
FIG. 2 shows a FTTS Server-Switch Line Replacement Unit based Inflight System Architecture.

FIG. 2 shows one embodiment of a server/switch LRU (SSL)-based IFE system architecture. In this embodiment, one or more SSLs 200 are interconnected with head-end fiber optic network cables 201 forming an aggregate head-end switch composed of all of the switches in SSLs 200. Offboard network 100A and onboard network 101A connect directly to one or more of SSLs 200 with one of head-end network cables 201. In addition, data loader 102A and cabin management terminal 111A connect directly to one or more of SSLs 200 with one of head-end network cables 201. Up to N VDUs 130A are connected directly to each SSL over one of fiber optic SSL to seat network cables 202. In this instance, a passenger seat LRU consists in only the VDU. In one embodiment, server functionality (application server, audio server, video server, games server, file server, passenger information system server) is integrated into SSLs 200 in a modular, scalable, robust fashion to minimize the impact on the IFE system in the event server functions in one or more SSLs 200 fail. Additonal details are disclosed in U.S. patent application Ser. No. 11/533,258, which is incorporated herein by reference in its entirety and made part of the specification hereof.

Figure 3:
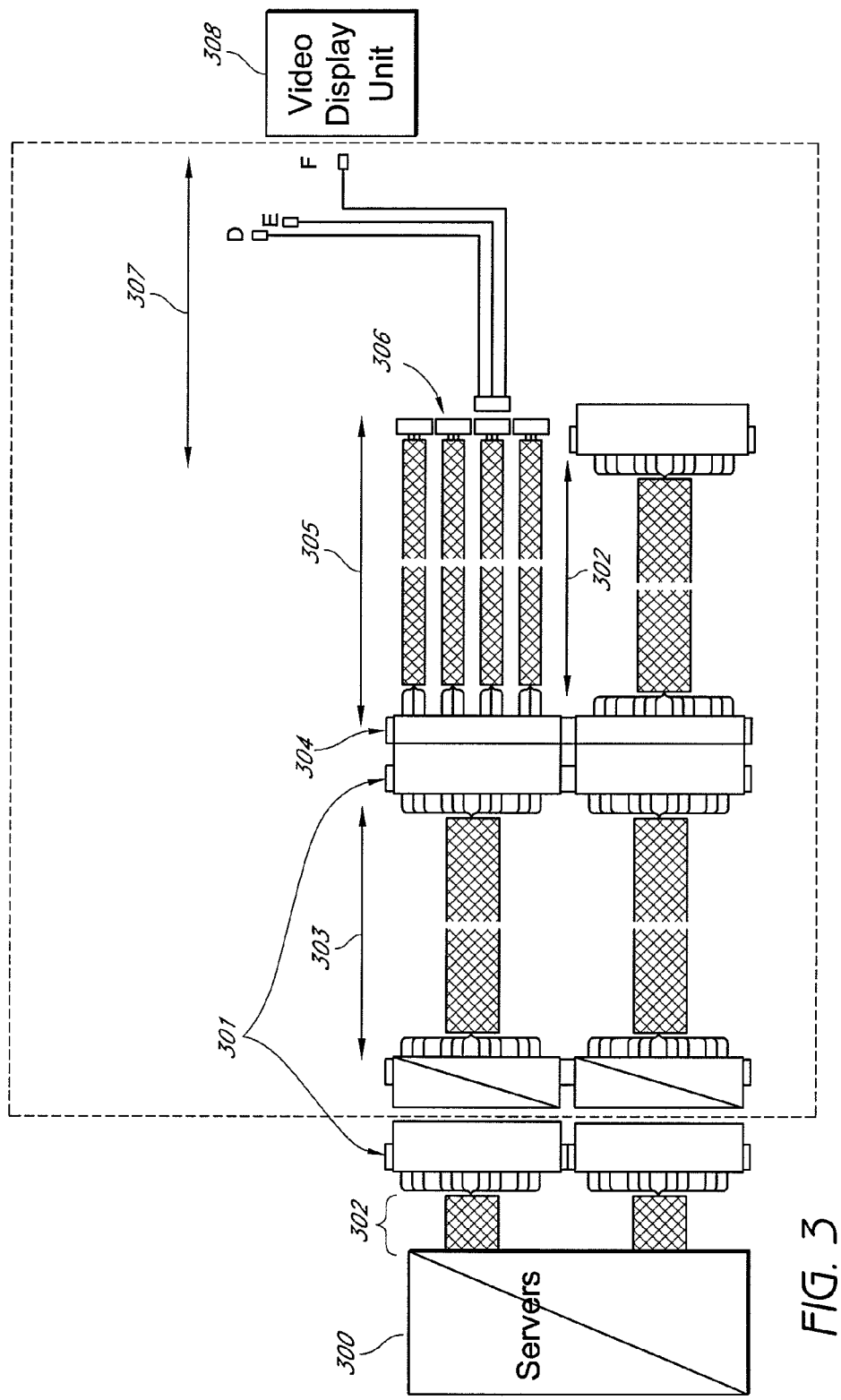
FIG. 3 shows a FTTS distribution system.

FIG. 3 shows one embodiment of a FTTS fiber distribution system used to distribute information content in connection with a passenger entertainment system such as entertainment systems deployed in airplanes, trains, ships etc. The FTTS fiber distribution system illustrated in FIG. 3 includes one or more servers 300. One function of the one or more servers 300 is marshalling of information. For example, the server can receive requests from its associated clients, process the request, gather information pertaining to the request from various sources such as its internal database or memory banks, other servers, the Internet, etc. and forward the information to the requesting clients. The one or more servers 300 receive, store, manage, process and distribute information content such as audio-video programming, streaming media, Internet data etc. The information content is transported over a series of cable assemblies and connect/disconnect systems from the one or more servers to the plurality of video display units. By transporting it is generally implied that the information is sent and/or received. The plurality of video display units are generally located on the seat-backs of the mode of transportation in which the passenger entertainment is deployed. However in some embodiments, the video display units may be located overhead or be disposed on the arm rest. The number of video display units may be equal to the number of seats in the mode of transporting people. However in some embodiments the number of video display units may be greater than or less than the number of seats in the mode of transporting people. Transporting information from one or more servers to the plurality of video display units is described in the following paragraphs.

One or more Trunk Line (TL) disconnects 301 are provided to one or more servers 300 through the TL to Server fiber network 302. In some embodiments, the TL to Server fiber network 302 can comprise TL to head-end cable assemblies which substantially join the server to the trunk line disconnects 301. Additional trunk line disconnects 301 may be joined in series through trunk line cable assemblies 303. One or more TL cable assemblies 303 may be provided in series between the TL to Server fiber network 302 and the trunk line to seat group cable disconnect 304. A Trunk Line to Seat Group disconnect cable assembly 305 joins the trunk line to seat group cable disconnect 304 to the seat group disconnect 306. Finally, the seat group disconnect to video display unit cable assembly 307 joins the seat group disconnect 306 to the video display unit 308. The various disconnects (e.g. 301, 304, 306) allow easy reconfiguration of the fiber distribution system. In the event of a component or system failure, it is advantageous to have various disconnects in the fiber distribution system as the failed component or system can be isolated for repair without affecting the rest of the system. The disconnects, also make the architecture modular and make the system scalable. All the cable assemblies described above can use single or multiple fiber optic network cables. The single or multiple fiber optic network cables may be active or passive.

The trunk line to server fiber network 302 can include a single or multiple fiber-optic cables. In some embodiments, one of the servers 300 can be joined to the trunk line disconnect 301 by a single fiber-optic cable. In some other embodiments, the single fiber optic cable from one of the servers 300 can be further divided into multiple fiber-optic cables, N, such that the number of divisions is less than or equal to the number of video display units or the number of passengers. In some embodiments, the plurality of video display units may be joined to one of the servers 300 by a fiber optic cable.

The seat group disconnects provide connectivity to a group of seats mounted to a common structure. The number of seats in a seat group can vary between 1 and 10. In some embodiments, the number of seats in a group may be larger than 10. In some embodiments, all the video display units can be joined or linked to a single server in the manner described above. In some other embodiments, a number, K, of video display units may be joined or provided to a single server, where K is less than the total number of video display units.

Figure 4:
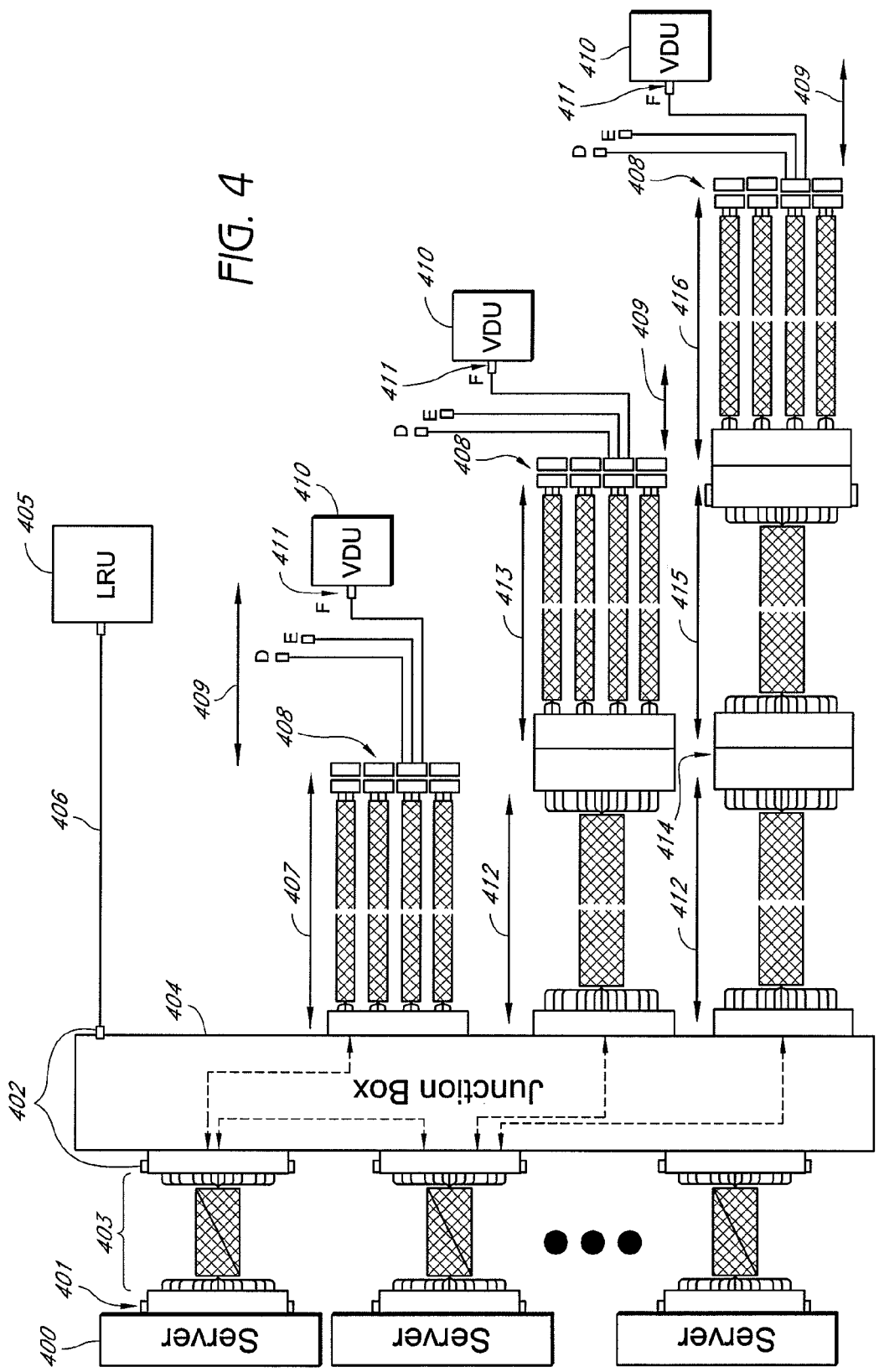
FIG. 4 shows a FTTS distribution system comprising a junction box.

FIG. 4 shows another embodiment of a FTTS fiber distribution system. The fiber distribution system illustrated in FIG. 4 includes one or more servers 400 having server disconnects 401. The server disconnect 401 is joined to a junction box disconnect 402 via one or more server to junction box cable assemblies 403. In some embodiments, the server to junction box cable assemblies can comprise server link cable assemblies. The junction box disconnect 402 is joined to a junction box 404. In some embodiments, the junction box may comprise a fiber optic connection system. The junction box 404 may have a plurality of ports to connect and disconnect systems and sub-systems. In one embodiment, the on-board network, off-board network, data loader and the server may be joined to the junction box via a passive fiber optic network. In some embodiments, the junction box may provide connection between two or more servers connected to the junction box via server link cable assemblies through a passive fiber optic network. In some embodiments each of a plurality of video display units may be connected to a server through a single passive fiber-optic network, the junction box and a server link cable assembly. In some embodiments one or more trunk line to head-end cable assemblies can be provided to the junction box 404. The junction box 404 may transport the information from the server to a line replacement unit 405 or a video display unit 410 over a series of cable assemblies. For example, a line replacement unit 405 may be joined via a cable 406 to a junction box disconnect 402. The junction box 404 may further comprise junction box to seat group cable assemblies 407 which join or link the junction box 404 to seat group disconnects 408. The junction box to seat group cable assemblies may 407 may be permanently attached to the junction box 404 or may be attached to the junction box 404 via disconnects. The seat group disconnect 408 may join to video display units 410 via seat group cable assemblies 409 and a video disconnect 411.

The junction box 404 may comprise junction box to trunk line cable assemblies 412. The junction box to trunk line cable assemblies 412 may be attached permanently to the junction box 404 or may be attached to the junction box via disconnects. The junction box to trunk line cable assemblies 412 may be serially joined to the trunk line to seat group assemblies 413 which are further linked serially to the trunk line to seat group disconnects 408. The seat group disconnect 408 may link to video display units 410 via seat group cable assemblies 409 and a video disconnect 411.

In some embodiments, the junction box 404 may also comprise junction box to trunk line cable assemblies 412 which are joined to trunk line cable assemblies 415 via trunk line disconnect 414. The trunk line cable assemblies 415 are in turn connected to trunk line to seat group cable assemblies 416. The trunk line to seat group cable assemblies 416 are connected to seat group disconnects 408 that may further connect to video display units 410 via seat group cable assemblies 409 and a video disconnect 411. In some embodiments, the video display units 410 can be joined to one of the servers 400 in a star configuration, wherein each video display unit 410 is joined to the junction box 404 with a fiber optic cable and the junction box 404 is joined to one of the servers 400.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A passenger entertainment system comprising:
   one or more integrated server/switch units;
   one or more trunk line to head-end cable assemblies having a first end and a second end, wherein said first end has a number, P, of cable terminations and said second end has a number, Q, of cable terminations, wherein the first end is provided to at least one of the one or more integrated server/switch units;

one or more trunk line disconnect assemblies having a first end and a second end, wherein said first end has Q connectors that substantially mate with the number, Q, of cable terminations on the second end of the trunk line to head-end cable assemblies;

one or more trunk line to seat group disconnect assemblies having a first end and a second end, wherein said first end of the trunk line to seat group disconnect assembly is substantially joined to the second end of the trunk line disconnect assembly by one or more trunk line cable assemblies;

one or more seat group disconnect assemblies having a first end and a second end, wherein the first end of the seat group disconnect assembly is substantially joined to the second end of the trunk line to seat group disconnect assembly by one or more trunk line to seat group disconnect cable assemblies;

a number, N, of seat group disconnect to video display unit cable assemblies, each of said seat group disconnect to video display unit cable assemblies having a first end and a second end, wherein said first end substantially provides connection with the second end of at least one seat group disconnect assembly; and a plurality of integrated video display units, each of the integrated video display units being substantially joined with the second end of one of the seat group disconnect to video display unit cable assemblies, wherein each of the integrated video display units has an individual communicative link with one of the integrated server/switch units via:
one of the trunk line to head-end cable assemblies,
one of the trunk line disconnect assemblies,
one of the trunk line cable assemblies,
one of the trunk line to seat group disconnect assemblies,
one of the trunk line to seat group disconnect cable assemblies,
one of the seat group disconnect assemblies, and
one of the seat group disconnect to video display unit cable assemblies, wherein each video display unit comprises a video display, a video display unit transceiver, a processor module, and one or more user input modules, and wherein each video display unit receives entertainment data from one of the integrated server/switch units via the individual communicative link.

2. The passenger entertainment system of claim 1, wherein the system is configured to be used in a mode of transporting people.

3. The passenger entertainment system of claim 2, wherein said number, Q, of cable terminations on the second end of the trunk line to head-end cable assembly is less than or equal to the number of seats in the mode of transporting people.

4. The passenger entertainment system of claim 1, wherein said one or more trunk line to head-end cable assemblies substantially joins to said one or more integrated server/switch units through said first end of the trunk line to head-end cable assemblies.

5. The passenger entertainment system of claim 1, wherein said one or more trunk line to head-end cable assemblies comprises a passive fiber optic network.

6. The passenger entertainment system of claim 1, wherein the seat group disconnect to video display unit cable assemblies comprises a passive fiber optic network.

7. The passenger entertainment system of claim 1, wherein said number, P, of cable terminations on the first end of the trunk line to head-end cable assembly is greater than or equal to 1.

8. The passenger entertainment system of claim 1, wherein said number, Q, of cable terminations on the first end of the trunk line to head-end cable assembly is greater than or equal to the number, P, of cable terminations on the first end of the trunk line to server cable assembly.

9. The passenger entertainment system of claim 1, wherein the number, N, of the seat group disconnect to video display unit cable assemblies is greater than or equal to 1.

10. The passenger entertainment system of claim 1, wherein the number, N, of the seat group disconnect to video display unit cable assemblies is between 1 and 10.

11. The passenger entertainment system of claim 1, further comprising a fiber-optic junction box configured to provide a fiber signal path from said one or more integrated server/switch units to one or more video display units,
wherein said one or more integrated server/switch units are joined to said fiber-optic junction box through one or more server link cable assemblies, and
wherein said one or more trunk line to head-end cable assemblies substantially joins to said fiber-optic junction box through said first end of the trunk line to head-end cable assemblies.

12. The passenger entertainment system of claim 11, wherein the fiber-optic junction box is further configured to provide a fiber signal path between two or more integrated server/switch units provided to said fiber-optic junction box with server link cable assemblies.

13. The passenger entertainment system of claim 11, wherein each of said one or more video display units is substantially joined to one of the integrated server/switch units through a passive fiber optic network, the junction box and a server link cable assembly.

14. The passenger entertainment system of claim 1, wherein said one or more video display units are provided with fiber disconnects.

15. The entertainment system of claim 1, wherein each of the integrated server/switch units further comprises:
an application server further comprising at least one of:
a video server;
an audio server;
a game server;
a file server; and
a passenger flight information system.

16. The system of claim 1, wherein the entertainment data is communicated directly from the server/switch unit to the respective integrated video display unit.

17. A method of distributing information in connection with passenger entertainment system, said method comprising;
marshalling information in an integrated server/switch unit;
transporting information from said integrated server/switch unit to one or more trunk line disconnect assemblies over one or more trunk line to head-end cable assemblies;
transporting information from said one or more trunk line disconnect assemblies to one or more trunk line to seat group disconnect assemblies over one or more trunk line cable assemblies;
transporting information from said one or more trunk line to seat group disconnect assemblies to one or more seat group disconnect assemblies over one or more trunk line to seat group disconnect cable assemblies; and
transporting information from said one or more seat group disconnect assemblies to one or more video display units over one or more seat group disconnect to video display unit cable assemblies, wherein each of the one or more video display units has an individual communicative link with the integrated server/switch unit via:
one of the trunk line to head-end cable assemblies,
one of the trunk line disconnect assemblies,
one of the trunk line cable assemblies,
one of the trunk line to seat group disconnect assemblies,
one of the trunk line to seat group disconnect cable assemblies,
one of the seat group disconnect assemblies, and
one of the seat group disconnect to video display unit cable assemblies,
wherein each video display unit comprises a video display, a video display unit transceiver, a processor module, and one or more user input modules.

18. The system of claim 17, wherein the information is transported directly from the server/switch unit to the video display unit.

* * * * *